United States Patent [19]

Schmitt

[11] 4,050,160

[45] Sept. 27, 1977

[54] DEVICE FOR LINEAR MEASUREMENT

[75] Inventor: Ewald Schmitt, Maintal, Germany

[73] Assignee: Messer Griesheim GmbH, Frankfurt am Main, Germany

[21] Appl. No.: 675,466

[22] Filed: Apr. 9, 1976

[30] Foreign Application Priority Data

Apr. 14, 1975   Germany .................... 1117394

[51] Int. Cl.² ............... G01B 3/12; G01B 7/04
[52] U.S. Cl. ........................................ 33/141 B
[58] Field of Search ........... 33/125 M, 141 R, 141 B, 33/129, 133, 132, 134 R, 134 A, 136, 141.5, 142; 72/10, 201

[56]   References Cited
U.S. PATENT DOCUMENTS

| 1,996,500 | 4/1935 | Adams | 72/201 |
| 2,650,034 | 8/1953 | Wiemer | 72/201 |
| 3,077,804 | 2/1963 | Manaloris | 33/141 B |
| 3,103,072 | 9/1963 | Golley et al. | 33/143 L |

Primary Examiner—Harry N. Haroian
Attorney, Agent, or Firm—Connolly and Hutz

[57]   ABSTRACT

A device for linearly measuring a hot work piece includes a measuring roller for contacting the underside of the work piece with the roller mounted on a shaft in a tilting arrangement. A water supply is provided on the shaft communicating with a channel which extends into the roller and with the roller being open on at least one side thereof.

8 Claims, 7 Drawing Figures

Fig. 5
Fig. 6
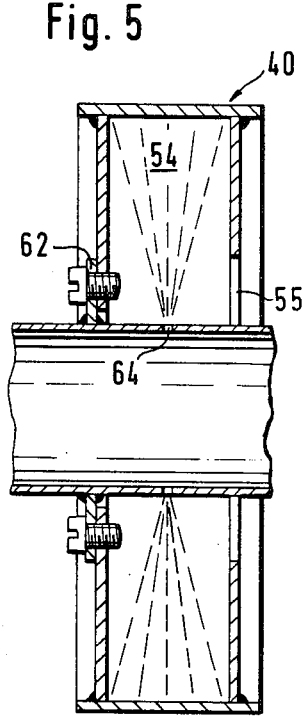
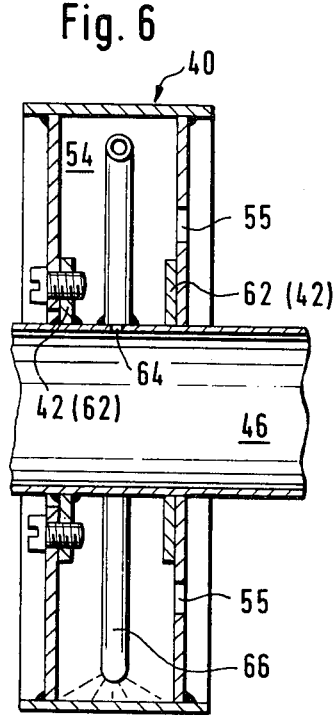
Fig. 6a
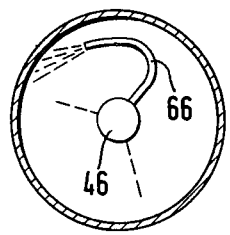

DEVICE FOR LINEAR MEASUREMENT

BACKGROUND OF THE INVENTION

The improvement relates to a device for linear measurement of a hot work piece to be separated by a torch-cutting machine, consisting of a water-cooled measuring roller, which is provided with a transmitter, determining the measuring length and connected with a control device of the torch-cutting machine.

It is known to use measuring rollers - water-cooled as a rule - for the measuring of the length of a work piece or a partial piece. In such practice the circumference of the measuring roller, rolling on the work piece, is utilized for the determination of the work piece length. Since in measuring, the measuring roller comes to abut directly the hot work piece, often still glowing or red hot, it is necessary to cool the measuring roller so that the roller diameter does not change due to the temperature influence (of the hot work piece), something which otherwise would lead to fault measurements.

In a measuring device (DT-OS 2,315,865) of the prior art, a measuring roller washed by coolant is employed. In this known embodiment, a coolant supply conduit ends laterally (in the area of the hub) in the measuring roller. This conduit is coaxially enveloped by a further conduit in the annular chamber (formed by this conduit and the coolant supply conduit) of which the "heated" coolant is again drawn off from the measuring roller in the form of a closed cycle. The bearing of the measuring roller takes place still in the area of the work piece so that additional cooling of the bearing point is required.

In addition, it is indispensably required to maintain tight the water supply and discharge, since otherwise a local cooling would set in due to the emerging water, something which results in a structural change in this work piece area.

SUMMARY OF THE INVENTION

An object of the present improvement, emanating from the above-mentioned state of the art, is to provide a device for the linear measurement, whose structural assembly is intentionally kept simple and consequently trouble-free, and wherein, furthermore, a constantly effective cooling of the measuring roller is achieved in a simple manner.

For accomplishing the above object, the measuring roller is arranged to the underside of the hot work piece and is supported by a shaft rotatably supported in a tilting arrangement; on the shaft there is provided a water supply connected with a coolant conduit; and in the shaft there is present a coolant channel which ends in the measuring roller, open at least on one flange side.

It is advantageous if the measuring roller is arranged on the free end of the hollow shaft.

For a stable arrangement of the novel measuring roller, it is advantageous furthermore if at the free shaft end a plurality of radially projecting holders is provided, said holders serving for the support of the measuring roller. It is also within the scope of the invention to provide, in place of a number of holders, a circular rotating cross-piece on which the measuring roller may then be mounted.

In accordance with a further aspect of the invention, according to the improvement, it is provided furthermore in each holder there is provided at least one bore connected with the coolant channel in the shaft and ending in the measuring roller. These bores, which are preferably in the shape of nozzles, serve for the purpose of spraying the coolant supplied through the shaft into the hollow measuring roller and thus effect an interior cooling of the measuring roller.

It is furthermore advantageous if the measuring roller has two flange pulleys bilaterally mounted on the holder, at the outside circumference of the pulleys there appearing a bearing surface, and that at least one of the two flange pulleys, in its inside area facing the shaft, has a water discharge orifice.

Alternatively, it is also possible in an advantageous manner to have the measuring roller mounted unilaterally on the holder and to have the other free flange pulley provided with the water outlet orifices.

By one or more orifices in one or even in both flange pulleys of the measuring roller, it is afforded that the coolant sprayed into the interior or the roller may without difficulty run downwards into the roller bed, hence away from the hot work piece to be measured. By this simplified water passage from the shaft to the measuring roller and from it outwards, according to the improvement, it is no longer required to provide expensive seals, as this was the case beforehand. In addition, there exist no bearing problems of the measuring roller in the area of the hot work piece, since it is firmly connected with the shaft. Furthermore, it is not indispensably necessary to use coolant with a high degree of purity (drinking water quality). The coolant supplied to the measuring roller need not be completely dirt-free therefore, since no sensitive bearing points are washed by water and thus clogged by dirt particles and damaged thereby. The same holds true for the seals (see in this connection the aforementioned DT-OS 2,315,865), which previously could easily be damaged by dirty coolant and thus be made permeable.

These disadvantages are no longer present in the improved measuring roller and subject also to its arrangement in the tilting arrangement, since here bearing and sealing problems no longer take place.

THE DRAWINGS

FIGS. 5–6a, illustrate two further embodiments of the measuring roller according to the invention.

DETAILED DESCRIPTION

Figure 1:
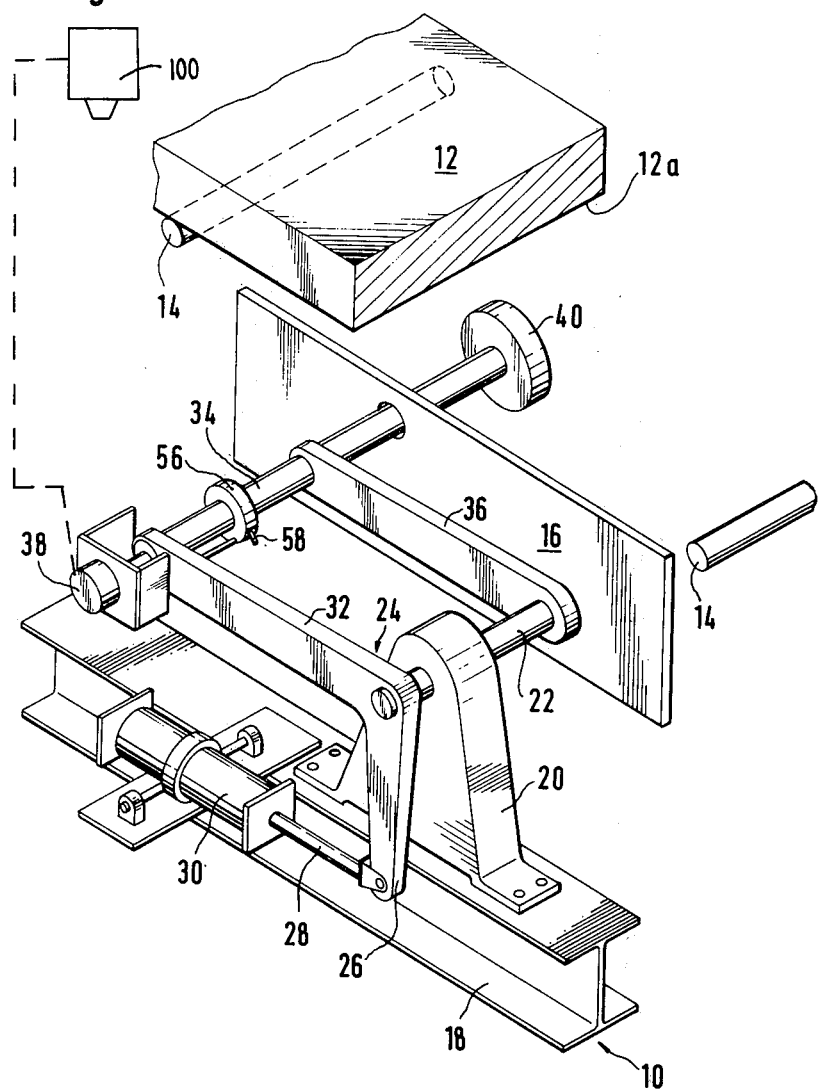
FIG. 1 shows a measuring device for a casting work piece in perspective illustration.
Figure 2:
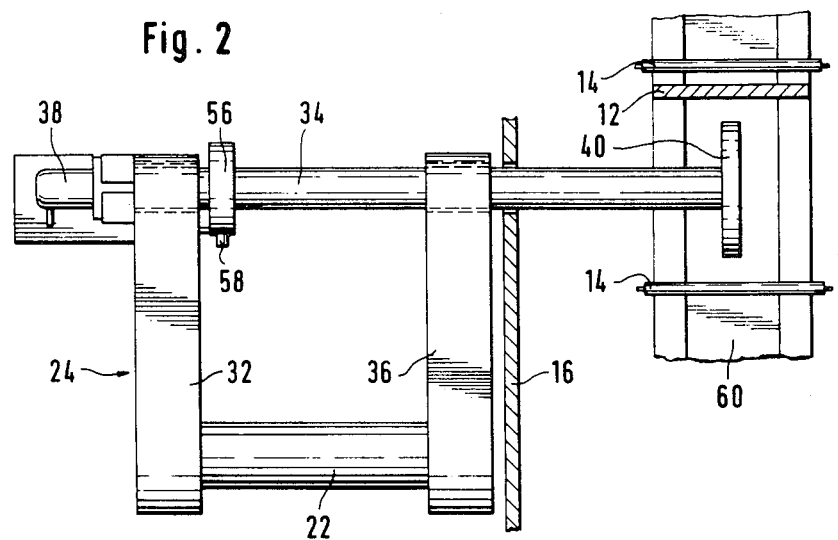
FIG. 2 is a top view of FIG. 1.

FIG. 1 illustrates a device 10 for the linear measurement of a hot work piece 12 or of a portion thereof. Such a linear measurement device is provided as a rule in continuous casting units and in particular in the work piece movement direction of the torch-cutting machine illustrated schematically as 100, which serves for the separation of work pieces. The measuring device 10, as shown in FIG. 2, is arranged to the side of the roller bed 14, which serves for the further conveyance of the work piece 12. For the prevention of a lateral heat radiation of the hot work piece to the measuring device 10, there is arranged between the latter and the roller bed 14 a protective plate 16.

On a basic support 18 (FIG. 1), there is arranged a bearing pedestal 20 in which a shaft 22 is turnably supported. On the one end of shaft 22 protruding from the side of the bearing pedestal 20 facing the protective plate 16, there is mounted an angle lever 24 whose one arm 26, projecting vertically downwards, is flexibly connected with the piston rod 28 of a hydraulic cylinder 30.

On the free end of the other lever arm 32 of the angle lever 24 there is turnably supported a second shaft 34. For the stabilization in position of this shaft, there is a connector 36 which with its one end is firmly connected with the first shaft 22 and in its other end has the second shaft 34 rotatably supported.

Shaft 34 supports at its end facing arm 32 a rotational generator or impulse transmitter 38, which transmits in a known manner the rotational moement of shaft 34 and the linear measuring value resulting therefrom to a control device of the torch-cutting machine. This type of length determination of the hot work piece is known to the state of the art and requires therefore no further explanation at this point.

For a direct contact of the measuring device with the work piece 12 to be measured, there is provided a measuring roller 40, which is mounted on the free end of shaft 34 facing the roller bed 14. Measuring roller 40 is pressed during the measuring procedure against the underside 12a by means of the cylinder 30, swiveling the measuring roller and shaft 34 by the longitudinal axis of shaft 22, so that a frictionally determined connection between work piece and measuring roller is produced.

Figure 3:
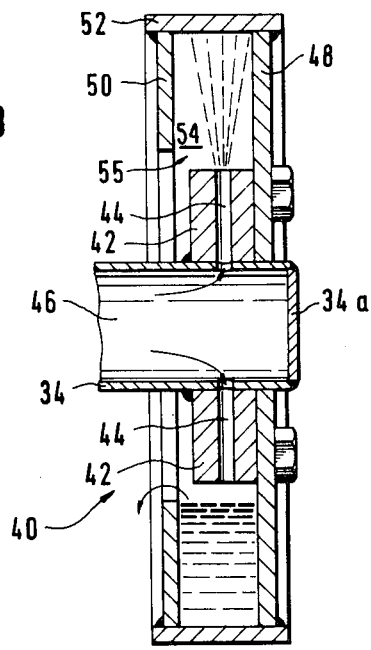
FIG. 3 shows in cross-section the construction of the measuring roller according to the invention.
Figure 4:
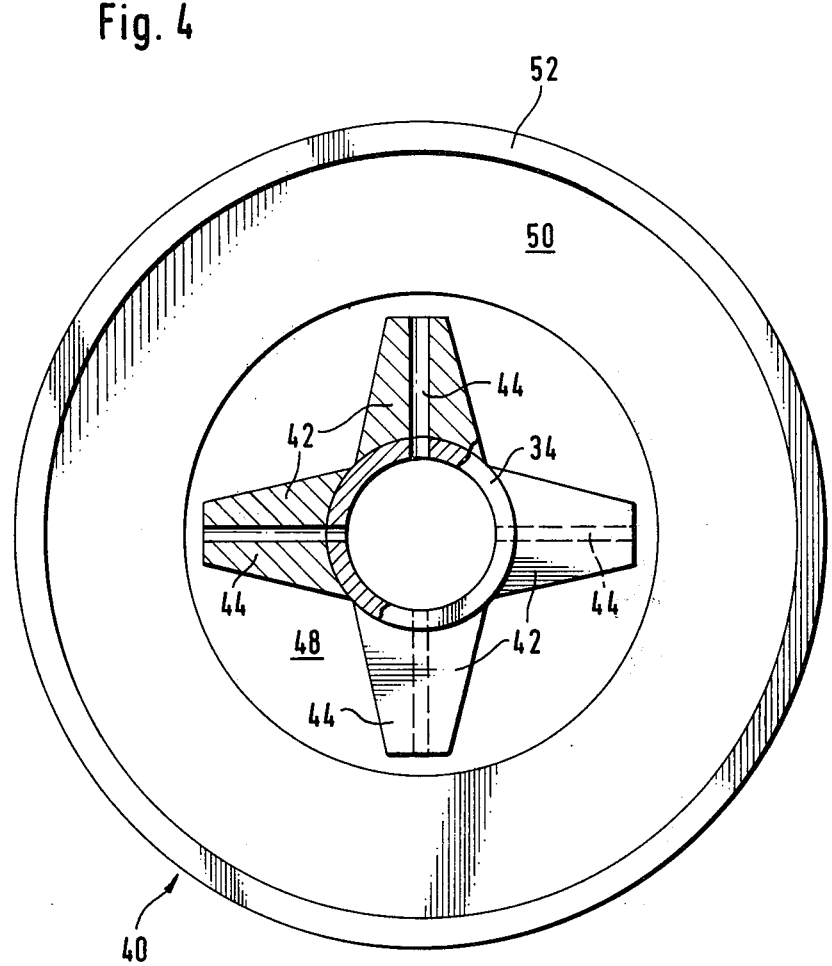
FIG. 4 is a side view of the device of FIG. 3 from the left.

FIGS. 3 and 4 show a measuring roller according to the invention in its structural design. At end 34a of shaft 34, there are welded four radially projecting holders 42, distributed at a uniform distance from the shaft circumference. Each of these holders contains a bore 44 which communicates at its inner end with a channel 46 provided in the interior of shaft 34. Thus by means of channel 46, shaft 34 may be considered hollow.

The measuring roller consists of two flange pulleys 48, 50 with a bearing surface 52 spanning their outside circumference. Flange pulley 48 serves to mount the roller on holders 42. The other flange pulley 50 is held only by the bearing surface (see FIG. 3) and is not in contact with holders 42 so that the interior space 54 of measuring roller 40 communicates with the atmosphere by means of orifice(s) 55.

It is also possible and is within the scope of the invention to provide instead of a circular flange pulley 50, in one or in both pulleys 48, 50 bores, slots or other orifices, all of which, however, are arranged in the area of the flange pulleys facing the bearing surface.

For the provision of water to the coolable measuring roller 40, there is provided at shaft 34 in the general area of the horizontal arm 32 a radial water supply 56, which in its construction resembles a ball bearing. The inner ring of the water supply 54 is rigidly connected with shaft 34 and rotates therewith, while the outer ring is mounted unturnably on arm 32. This outer ring has a water connection 58 through which the coolant reaches channel 46 through bores in shaft 34. By means of the water flowing through channel 46, a cooling of shaft 34 thus occurs. The water is then sprayed from channel 46 through bores 44 into the inner chamber 54 of measuring roller 40 and serves there for a continuous cooling of the measuring roller abutting the underside 12a of the hot work piece 12. The coolant sprayed into the inside chamber 54 flows through orifice(s) 55 downwards (i.e. away from work piece 12) out of the roller and is collected in a trough 60 (FIG. 2), provided at the bottom of roller bed 14, wherefrom it may again be conducted to the water connection 58 by means of a purifying device as well as a pump.

Because of the structural design of the measuring roller, subject to the "open" coolant cycle, a practically optimum cooling of the roller is achieved. In addition, the measuring roller is considerably easier to mount, since bearings are no longer present in the roller area, so that in addition normal industrial water may also be used for cooling purposes, since no sealing and bearing problems set in. A determination of dirt particles possibly existing in the coolant is thus no longer needed, so that the measuring roller may be designated as service-free, in contrast to previous ones. In case of need, the measuring roller may be easily unscrewed from the holder and replaced - a procedure therefore which is completed in a few minutes, whereas in the known water-cooled measuring rollers, the mounting of the bearings as well as of the seal is very time consuming.

It is also within the scope of the invention also to provide other measuring roller designs. In place of individual holders 42 a radially projecting revolving cross-piece 62 may be provided as shown in FIG. 5. In this instance, the coolant reaches the inner chamber 54 of the measuring roller through a plurality of holes 64 existing in shaft 34.

According to a further embodiment the measuring roller (FIG. 6 and 6a) may have protruded into the inside chamber 54 a plurality of curved tubes 66 through which the coolant is sprayed directly on the inner side of bearing surface 52.

What is claimed is:

1. A device for the linear measurement of a hot workpiece to be separated by a torch-cutting machine comprising a water cooled measuring roller, a rotatable shaft, said roller being mounted on said shaft for rotation therewith, said shaft being rotatably mounted in tilting means, said tilting means moving said shaft and said roller to and form a position where said roller contacts the underside of the hot workpiece which in turn moves with respect to said roller whereby said roller is caused to rotate by the relative motion of the workpiece, transmitter means for said roller for determining a measuring length in accordance with said rotation of said roller and for connection with a control device of a torch cutting machine, said shaft having a cooling channel therein whereby said shaft is hollow, a water supply on said shaft communicating with said cooling channel, said cooling channel terminating in said roller whereby water may flow to said roller, said roller having a flange on one side of said roller to which said shaft is secured, and said roller being open to the atmosphere on the side of said roller opposite said flange whereby water flowing into said roller may be expelled to the atmosphere through said open side.

2. A device of claim 1 wherein a second flange is mounted on said open side of said measuring roller, said first and said second flanges being in the form of pulleys, a bearing surface spanning the outside circumference of said pulleys to form with said pulleys a chamber for the water in said roller, both of said flanges being mounted to said shaft, and said second flange having a water discharge orifice whereby said roller is thereby open on said open side thereof.

3. A device of claim 1 wherein a second flange is mounted on said open side of said measuring roller, said first and said second flanges being in the form of pulleys, a bearing surface spanning the outside circumference of said pulleys to form a chamber for the water in said roller, said first flange being mounted to said shaft, said second flange being freely mounted and held in place by said bearing surface, and said second flange having a water discharge orifice whereby said roller is thereby open on said open side thereof.

4. A device of claim 1, wherein said measuring roller is arranged at the free end of said hollow shaft.

5. A device of claim 4 wherein a plurality of radially projecting holders are provided on said free end of said shaft supporting said measuring roller.

6. A device of claim 5 wherein in each of said holders there is provided at least one bore communicating with said coolant channel in said shaft.

7. A device of claim 6 wherein a second flange is mounted on said open side of said measuring roller, said first and second flanges being in the form of pulleys mounted on both sides of said holders, a bearing surface spanning the outside circumference of said pulleys, said first flange being on the remote end of said shaft, and a water discharge orifice in said second flange whereby said roller is thereby open on said open side thereof.

8. A device of claim 6 wherein a second flange is mounted on said open side of said measuring roller, said first and said second flanges being in the form of pulleys, a bearing surface spanning the outside circumference of said pulleys, said first flange being mounted to said holders, said second flange being freely mounted and held in place by said bearing surface, and said second flange having a water discharge orifice whereby said roller is thereby open on said open side thereof.

* * * * *